United States Patent
Yoon et al.

(10) Patent No.: US 9,137,313 B2
(45) Date of Patent: Sep. 15, 2015

(54) DATA TRANSMISSION SYSTEM AND METHOD USING RELAY SERVER

(75) Inventors: Hee Tae Yoon, Seoul (KR); Jae Min Song, Seoul (KR); Myoung Kyhun Choi, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 308 days.

(21) Appl. No.: 13/312,484

(22) Filed: Dec. 6, 2011

(65) Prior Publication Data

US 2012/0166593 A1    Jun. 28, 2012

(30) Foreign Application Priority Data

Dec. 27, 2010  (KR) .......................... 10-2010-0135270

(51) Int. Cl.
| | |
|---|---|
| G06F 15/16 | (2006.01) |
| H04L 29/08 | (2006.01) |
| H04L 29/12 | (2006.01) |
| H04L 29/06 | (2006.01) |

(52) U.S. Cl.
CPC ................ H04L 67/18 (2013.01); H04L 61/15 (2013.01); H04L 61/2553 (2013.01); H04L 61/2589 (2013.01); H04L 69/165 (2013.01); H04L 67/104 (2013.01)

(58) Field of Classification Search
CPC ............ H04L 61/2589; H04L 12/4641; H04L 29/12566; H04L 61/2575; H04L 65/105
USPC .................................................. 709/203, 219
See application file for complete search history.

(56) References Cited

U.S. PATENT DOCUMENTS

| | | | |
|---|---|---|---|
| 7,221,666 B2* | 5/2007 | Inoue et al. ................... | 370/338 |
| 2002/0095506 A1* | 7/2002 | Tanimoto ...................... | 709/227 |
| 2004/0105433 A1 | 6/2004 | Seo | |
| 2004/0139228 A1* | 7/2004 | Takeda et al. ................. | 709/245 |
| 2006/0182100 A1* | 8/2006 | Li et al. ......................... | 370/389 |
| 2006/0256771 A1 | 11/2006 | Yarlagadda | |
| 2007/0233844 A1* | 10/2007 | Tanimoto ...................... | 709/223 |
| 2007/0253418 A1 | 11/2007 | Shiri et al. | |
| 2008/0089349 A1 | 4/2008 | Tanimoto | |
| 2008/0112417 A1* | 5/2008 | Hamamoto et al. ..... | 370/395.54 |

(Continued)

FOREIGN PATENT DOCUMENTS

| | | |
|---|---|---|
| CN | 101106550 A | 1/2008 |
| CN | 101163082 A | 4/2008 |

(Continued)

OTHER PUBLICATIONS

Communication dated Mar. 6, 2012 issued by the European Patent Office in counterpart European Patent Application No. 11191325.7.

(Continued)

*Primary Examiner* — Duyen Doan
(74) *Attorney, Agent, or Firm* — Sughrue Mion, PLLC

(57) ABSTRACT

Provided are a data transmission system and method of using a relay server. In the data transmission method using the relay server, the relay server transmits a registration result message to a client after registering the client through a registration packet when the client transmits the registration packet to the relay server. The relay server transmits registration information of the client to a location server. The location server stores client registration information according to each client.

37 Claims, 6 Drawing Sheets

(56) References Cited

U.S. PATENT DOCUMENTS

2009/0073969 A1* 3/2009 Gobara et al. ............... 370/389
2009/0232138 A1* 9/2009 Gobara et al. ............... 370/392
2009/0313386 A1* 12/2009 Hamamoto et al. .......... 709/245
2009/0316708 A1* 12/2009 Yahyaoui et al. ............ 370/401
2009/0319674 A1* 12/2009 Yahyaoui et al. ............ 709/228

FOREIGN PATENT DOCUMENTS

| | | |
|---|---|---|
| CN | 101594242 A | 12/2009 |
| EP | 1901520 A1 | 3/2008 |
| EP | 2448206 A1 | 5/2012 |
| KR | 10-2003-0030231 A | 4/2003 |
| WO | 2005043848 A1 | 5/2005 |

OTHER PUBLICATIONS

Communication dated Jun. 22, 2012 issued by the European Patent Office in counterpart European Application No. 11191325.7.

Jennings, C., et al, "Managing Client Initiated Connections in the Session Initiation Protocol," Network Working Group, May 11, 2009, 49 pages, XP015062349.

Communication issued Jun. 25, 2012 by the Korean Intellectual Property Office in counterpart Korean Application No. 10-2010-0135270.

Communication dated Mar. 20, 2014, issued by the State Intellectual Property Office of the People's Republic of China in counterpart Chinese Application No. 201110389291.4.

* cited by examiner

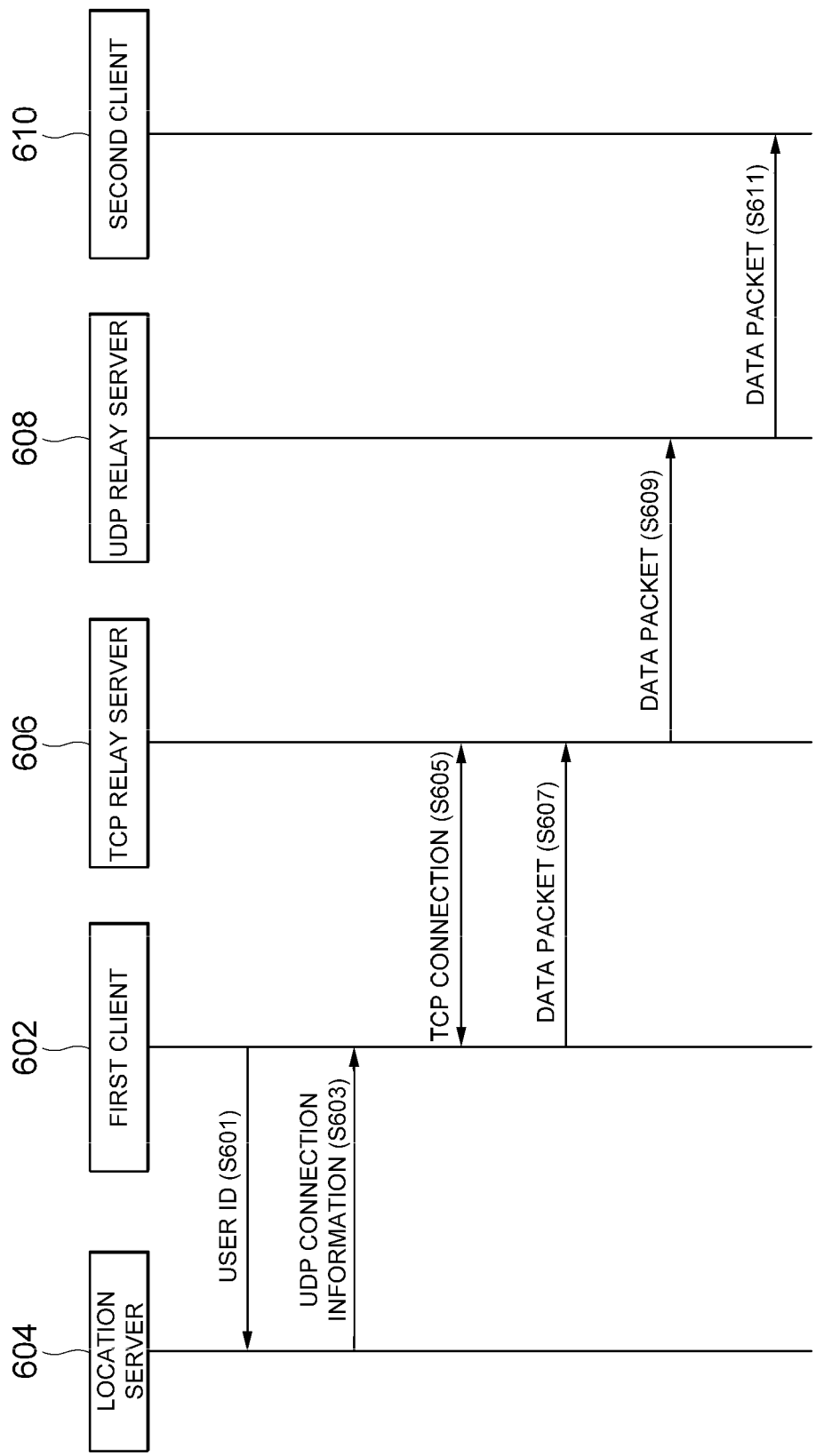

DATA TRANSMISSION SYSTEM AND METHOD USING RELAY SERVER

CROSS-REFERENCE TO RELATED APPLICATION

This application claims priority from and the benefit of Korean Patent Application No. 10-2010-0135270, filed on Dec. 27, 2010, the disclosure of which is hereby incorporated herein by reference in its entirety.

BACKGROUND

1. Field

Exemplary embodiments relate to data transmission technology, and more particularly, to data transmission technology using a relay server.

2. Discussion of Related Art

Peer-to-peer (P2P) technology enables users to share various information and content by directly connecting individual terminals. The P2P technology has initially been used as means for enabling users to unlawfully share music files and video files with each other on the Internet. However, recently, the P2P technology has been utilized in various services such as file transmission between clients in a messenger system, audio data transmission in Internet telephony, and the like. The number of fields using the P2P technology is increasing.

If a direct connection between clients is not possible because the clients exist in private networks in the P2P technology, a method of relaying data using a relay server is used. At this time, a user datagram protocol (UDP) relay server is used when UDP data is relayed, and a transmission control protocol (TCP) relay server is used when TCP data is relayed. However, the data transmission method using the relay server in the related art has the following problems.

The first problem is that a client should be periodically connected to a specific server so as to establish a connection to a service and exchange data (a message, a file, or the like) with other clients. For this, many service providers configure login servers so that the clients can access services when the clients are authenticated by the login servers. At this time, the client maintains a TCP connection to the login server, and recognizes a state in which a P2P service is available through the TCP connection. However, a heavy load is placed on the server when the clients continuously maintain TCP connections through the login server.

The second problem is that each client should transmit data to a second client through the relay server after establishing a connection to the relay server (the TCP relay server or the UDP relay server) if a direct connection between clients is not possible because the clients exist in private networks. However, because the TCP relay server relays only TCP data and the UDP relay server relays only UDP data, the client does not transmit data through the UDP relay server in an environment where a UDP connection is not possible. When types of relay servers connected to the clients are different from each other, data transmission may be impossible.

The third problem is that data transmission is not directly ensured because each client is not in a state in which a direct connection to a second client is established when data is relayed through the relay server between the clients. That is, there is a problem in that the reliability of data transmission is not ensured because it is not possible to directly determine whether or not a second client has successfully received its own sent data.

SUMMARY

Exemplary embodiments provide a data transmission system and method using a relay server that can maintain a P2P network connection without a login server.

Exemplary embodiments also provide a data transmission system and method using a relay server that can transmit data, regardless of a TCP use environment and a UDP use environment.

Exemplary embodiments also provide a data transmission system and method using a relay server that can ensure data transmission between clients.

According to an exemplary embodiment, there is provided a data transmission system using a relay server, including: the relay server; and a client configured to transmit a registration packet to the relay server, wherein the relay server transmits a registration result message to the client after registering the client through the registration packet.

According to another exemplary embodiment, there is provided a data transmission method using a relay server, including: (A) receiving, by the relay server, a registration packet from a client; (B) transmitting, by the relay server, a registration result message to the client after registering the client through the registration packet; and (C) transmitting, by the relay server, registration information of the client to a location server.

BRIEF DESCRIPTION OF THE DRAWINGS

The above and other objects, features and advantages will become more apparent to those of ordinary skill in the art by describing in detail exemplary embodiments thereof with reference to the accompanying drawings, in which:

FIG. 7 is a diagram showing a method of transmitting data from a client using TCP to a client using UDP.

DETAILED DESCRIPTION OF EXEMPLARY EMBODIMENTS

A data transmission system and method using a relay server according to an exemplary embodiment will be described in detail below with reference to FIGS. 1 to 7.

In the following description, well-known technology related to the exemplary embodiments is not described in detail in order to keep the disclosure clear and concise. Terms used herein have been chosen in consideration of functionality of the exemplary embodiments, and may vary depending on a user's or an operator's intentions, or customs in the art. Therefore, the meanings of terms should be interpreted based on the overall context of the present specification.

These exemplary embodiments are provided so that the present disclosure will be thorough and complete and will fully convey the inventive concept those skilled in the art, and the exemplary embodiments will only be defined by the appended claims and their equivalents.

1. P2P Network Connection Maintenance

In an exemplary embodiment, each client maintains a P2P network connection and exchanges data through only a relay server without establishing a connection to a separate server such as a login server. In this regard, the case where the client is connected to a TCP relay server and the case where the client is connected to a UDP relay server are divided and described. Here, the client is connected to the TCP relay server or the UDP relay server according to a network environment to which the client belongs.

1-1. Case where Client is Connected to TCP Relay Server

Figure 1:
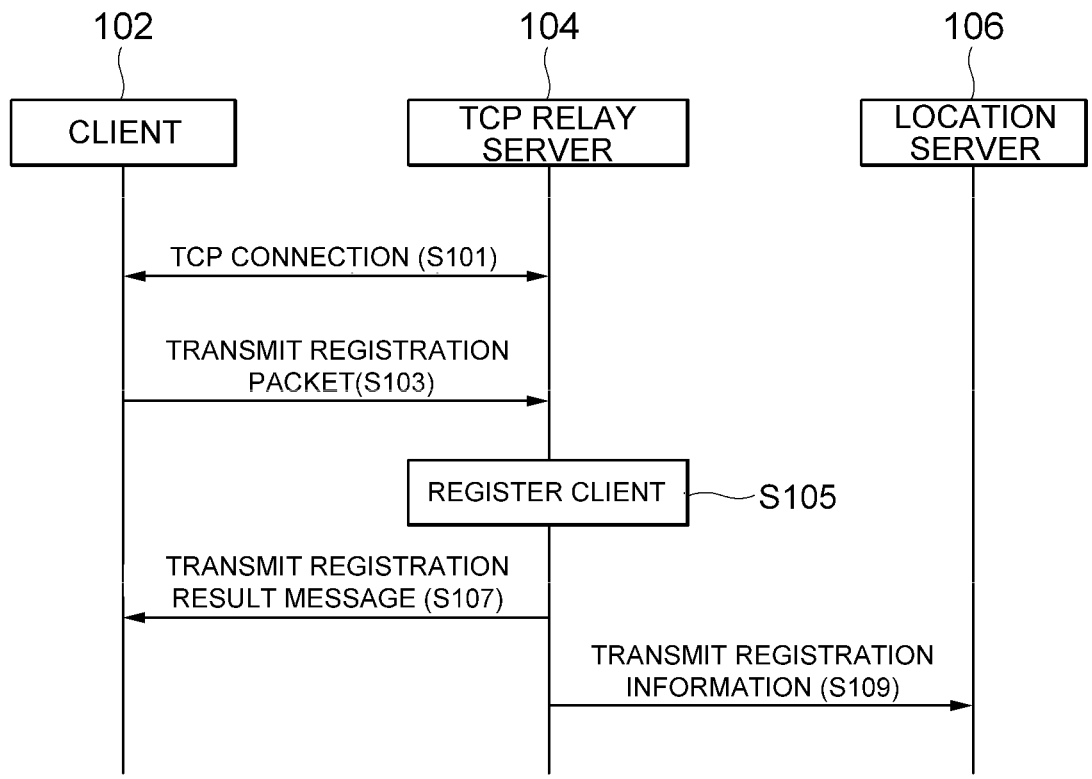
FIG. 1 is a diagram showing a method in which a client maintains a P2P network connection by establishing a connection to a TCP relay server according to an exemplary embodiment.

FIG. 1 is a diagram showing a method in which the client maintains a P2P network connection by establishing a connection to the TCP relay server according to an exemplary embodiment.

Referring to FIG. 1, a client 102 establishes a TCP connection to a TCP relay server 104 (S101).

Specifically, if the client 102 transmits a synchronization (SYN) packet to the TCP relay server 104, the TCP relay server 104 transmits an SYN+acknowledgement (ACK) packet as a response to the SYN packet to the client 102. Then, the client 102 transmits an ACK packet as a response to the SYN+ACK packet. Therefore, a TCP connection is established between the client 102 and the TCP relay server 104 through a 3-way handshake method.

Next, the client 102 transmits a registration packet to the TCP relay server 104 (S103).

Figure 2:
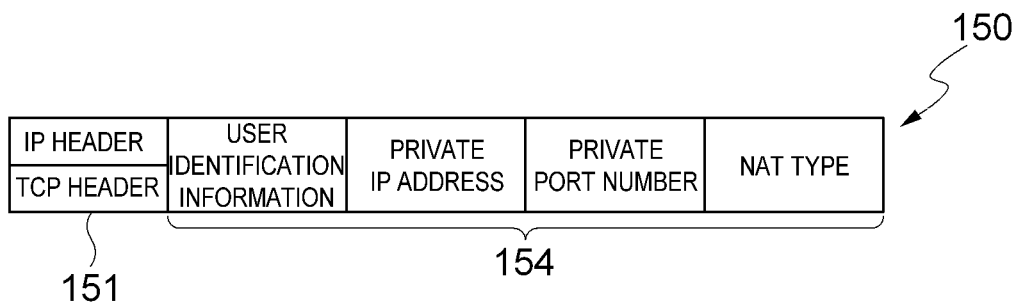
FIG. 2 is a diagram showing a registration packet to be transmitted by a client to the TCP relay server according to an exemplary embodiment.

FIG. 2 is a diagram showing a registration packet to be transmitted by a client to the TCP relay server according to an exemplary embodiment.

Referring to FIG. 2, a registration packet 150 includes a header 151 and a payload 154. The header 151 includes an IP header and a TCP header. The IP header includes a private IP address of the client 102 and the TCP header includes a private port number of the client 102.

The payload 154 includes user identification information of the client 102, the private IP address of the client 102, and information regarding the private port number of the client 102, a network address translator (NAT) type of a private network to which the client 102 belongs, and the like.

The user identification information is unique information for identifying the client 102 from other clients. An example of the user identification information may include a user identifier (ID), a user's unique number mapped to the user ID, a media access control (MAC) address of the client 102, or the like.

A NAT is a device for mutually converting an IP private address and a public IP address between a private network and a public network. When the client 102 belongs to the private network, the client 102 uses the NAT so as to save a public IP address of the Internet or protect the client 102 from an external attack.

There may be four NAT types: full cone, restricted cone, port restricted cone, and symmetric cone. The client 102 includes information regarding the NAT type of the private network to which the client 102 belongs in the registration packet and transmits the registration packet to the TCP relay server 104.

Here, the registration packet 150 transmitted by the client 102 is delivered to the TCP relay server 104 through the NAT of the private network to which the client 102 belongs. At this time, the NAT converts a private IP address of the client 102 included in an IP header of the registration packet 150 into a public IP address mapped thereto, converts a private port number of the client 102 included in the TCP header into a public port number mapped thereto, and delivers the public IP address and the public port number.

Next, the TCP relay server 104 registers the client 102 in the TCP relay server 104 using information included in the registration packet (S105). Then, the TCP relay server 104 has registration information for the client 102.

The registration information includes the user identification information of the client 102, the private IP address of the client 102, the private port number of the client 102, the NAT type of the private network to which the client 102 belongs, the mapped public IP address of the client 102, and the mapped public port number of the client 102.

Next, the TCP relay server 104 transmits a registration result message to the client 102 (S107).

In this case, the client 102 is in a state in which a connection to a P2P network is established and a P2P service is possible. This state is continued while a TCP connection to the TCP relay server 104 is maintained. At this time, the client 102 may transmit/receive data to/from other clients through the TCP relay server 104.

As described above, the client 102 is registered in the TCP relay server 104, thereby determining whether or not the client 102 is in a state in which a P2P service is possible without use of a separate login server, and performing data communication with other clients. Here, if a TCP connection between the client 102 and the relay server 104 is terminated, the TCP relay server 104 performs a registration release procedure by determining that the client 102 has been logged out.

Next, the TCP relay server 104 transmits registration information of the client 102 to the location server 106 (S109). Then, the location server 106 stores the registration information of the client 102.

1-2. Case where Client is Connected to UDP Relay Server

Figure 3:
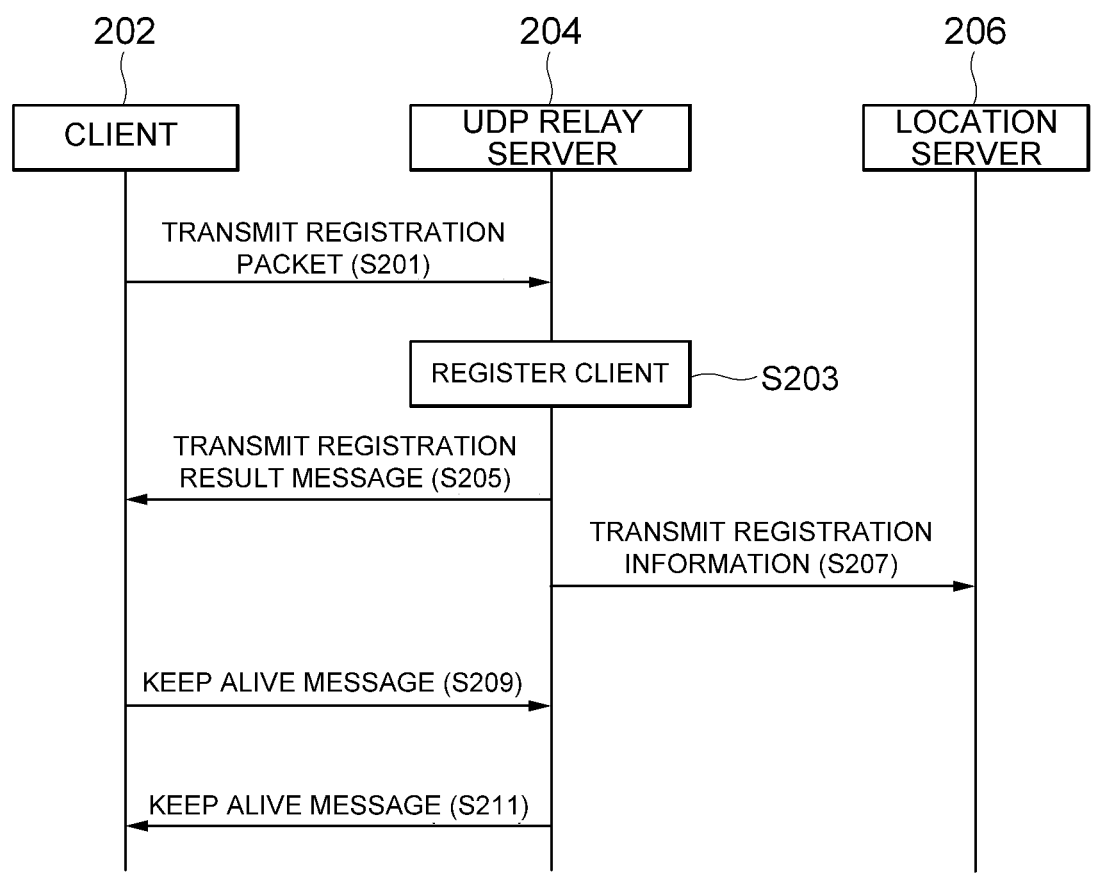
FIG. 3 is a diagram showing a method in which a client maintains a P2P network connection by establishing a connection to a UDP relay server according to an exemplary embodiment.

FIG. 3 is a diagram showing a method in which the client maintains a P2P network connection by establishing a connection to the UDP relay server according to an exemplary embodiment.

Referring to FIG. 3, a client 202 transmits a registration packet to a UDP relay server 204 (S201). That is, because UDP does not provide a connection function as in TCP, the client 202 initially transmits a registration packet to the UDP relay server 204.

The registration packet transmitted by the client 202 is the same as the registration packet shown in FIG. 2, except that the registration packet transmitted by the client 202 has a UDP header in place of a TCP header. The registration packet is delivered to the UDP relay server 204 through a NAT of a private network to which the client 202 belongs. At this time, the NAT converts a private IP address of the client 202 included in an IP header of the registration packet into a public IP address mapped thereto, converts a private port number of the client 202 included in the UDP header into a public port number mapped thereto, and delivers the public IP address and the public port number.

Next, the UDP relay server 204 registers the client 202 in the UDP relay server 204 using information included in the registration packet (S203). Then, the UDP relay server 204 has registration information for the client 202.

The registration information includes user identification information of the client 202, the private IP address of the client 202, the private port number of the client 202, the NAT type of the private network to which the client 202 belongs, the mapped public IP address of the client 202, and the mapped public port number of the client 202.

Next, the UDP relay server 204 transmits a registration result message to the client 202 (S205), and transmits registration information of the client 202 to a location server 206 (S207). Then, the location server 206 stores the registration information of the client 202.

Next, if the client 202 periodically transmits a Keep Alive message to the UDP relay server 204 (S209), the UDP relay server 204 retransmits the Keep Alive message to the client 202 in a loopback mode (S211). Through this, the client 202 can determine whether or not the client 202 is in a state in which the P2P service is possible (that is, a connection to a P2P network is established).

At this time, the UDP relay server 204 checks a reception time of the Keep Alive message from the client 202. If the Keep Alive message is not received from the client 202 for a preset time or more, the UDP relay server 204 determines that a connection to the client 202 has been terminated.

As described above, it is possible to determine whether or not the client 202 is in a state in which the P2P service is possible and perform data communication with other clients without use of a separate login server by registering the client 202 in the UDP relay server 204 and periodically transmitting the Keep Alive message.

2. Data Transmission Regardless of Network Use Environment

In an exemplary embodiment, it is possible to perform data transmission using a relay server (a TCP relay server and a UDP relay server) regardless of whether TCP or UDP being used in the environment of each client. In this regard, cases are divided and described according to network use environments of clients.

2-1. Case where Data is Transmitted from Client Using UDP to Client Using UDP

Figure 4:
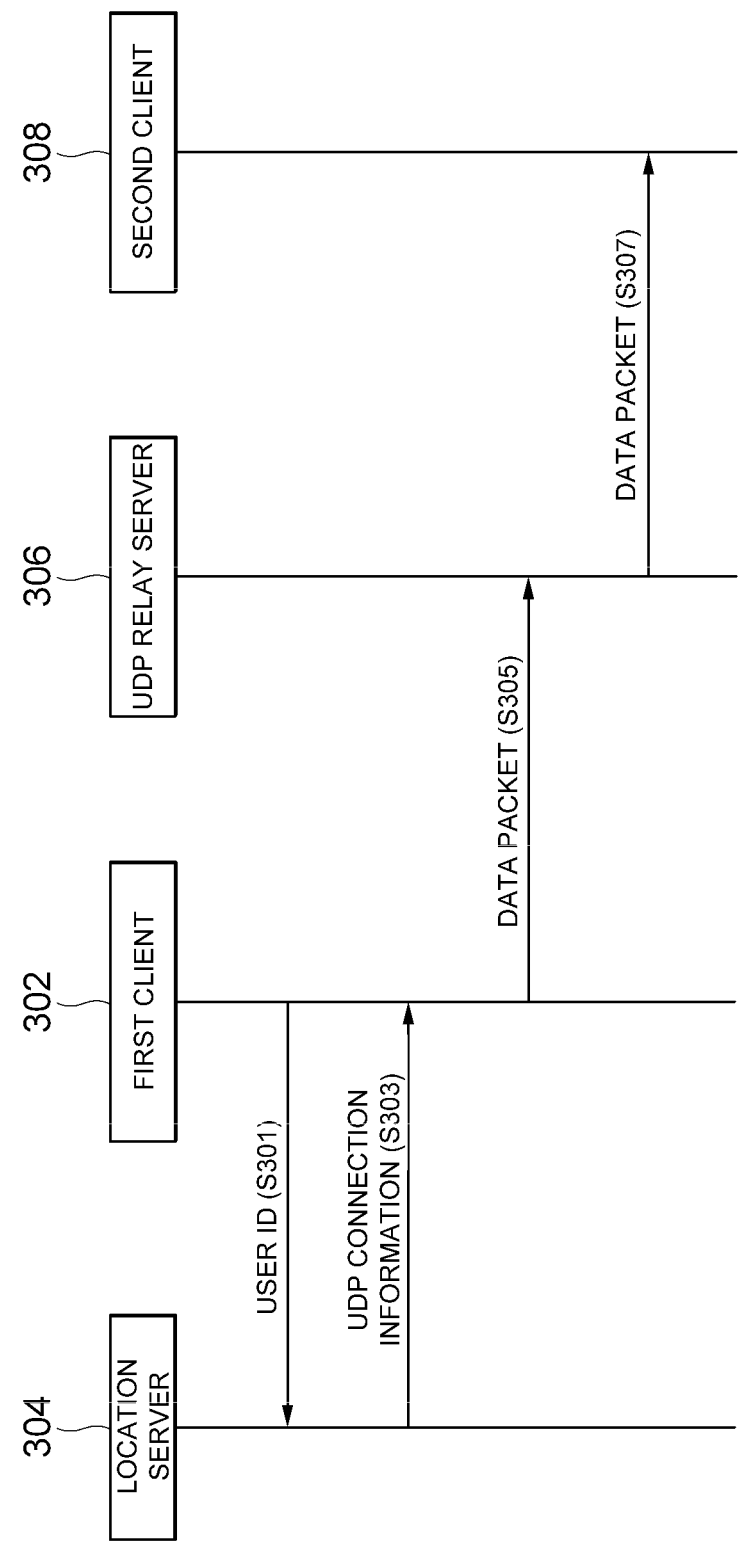
FIG. 4 is a diagram showing a method of transmitting data from a client using UDP to a client using UDP.

FIG. 4 is a diagram showing a method of transmitting data from a first client using UDP to second client using UDP.

Referring to FIG. 4, when a first client 302 transmits data to a second client 308, the first client 302 transmits a user ID of the second client 308 to a location server 304 (S301). At this time, the first client 302 may acquire the user ID of the second client 308, for example, through friend finding of a messenger service or the like.

Next, the location server 304 transmits UDP connection information to the first client 302 after checking the UDP connection information of the second client 308 through the user ID of the second client 308 (S303). The UDP connection information includes an address of the UDP relay server connected (e.g. coupled) to the second client 308 and an address mapped to a public network of the second client 308 (for example, a public IP address mapped to a private IP address of the second client 308 and a public port number mapped to a private port number of the second client 308).

That is, because the UDP relay server transmits registration information of each client to the location server when the UDP relay server registers each client as described with reference to FIG. 3, the location server stores client-specific registration information and an address of the UDP relay server to which the registration information of each client is transmitted. Accordingly, if the user ID of the second client 308 is received from the first client 302, the location server 304 may check the UDP connection information of the second client 308 through the user ID.

Next, the first client 302 transmits a data packet including the address mapped to the public network of the second client 308 to the UDP relay server 306 after checking an address of the UDP relay server 306 connected to the second client 308 from the UDP connection information (S305). At this time, the data packet includes an ID for identifying whether or not the data packet is a message to be relayed by the UDP relay server 306 or a message to be processed by the UDP relay server 306.

Next, the UDP relay server 306 transmits the data packet to the address mapped to the public network of the second client 308 after checking the address mapped to the public network of the second client 308 from the data packet (S307). Then, a NAT belonging to the private network of the second client 308 converts a public IP address among addresses mapped to the public network into a private IP address mapped thereto, converts a public port number of an address mapped to the public network into a private port number mapped thereto, and delivers the private IP address and the private port number to the second client 308.

At this time, the second client 308 can receive the data packet because a connection is maintained through hole punching with the UDP relay server 306.

2-2. Case where Data is Transmitted from Client Using TCP to Client Using TCP

Figure 5:
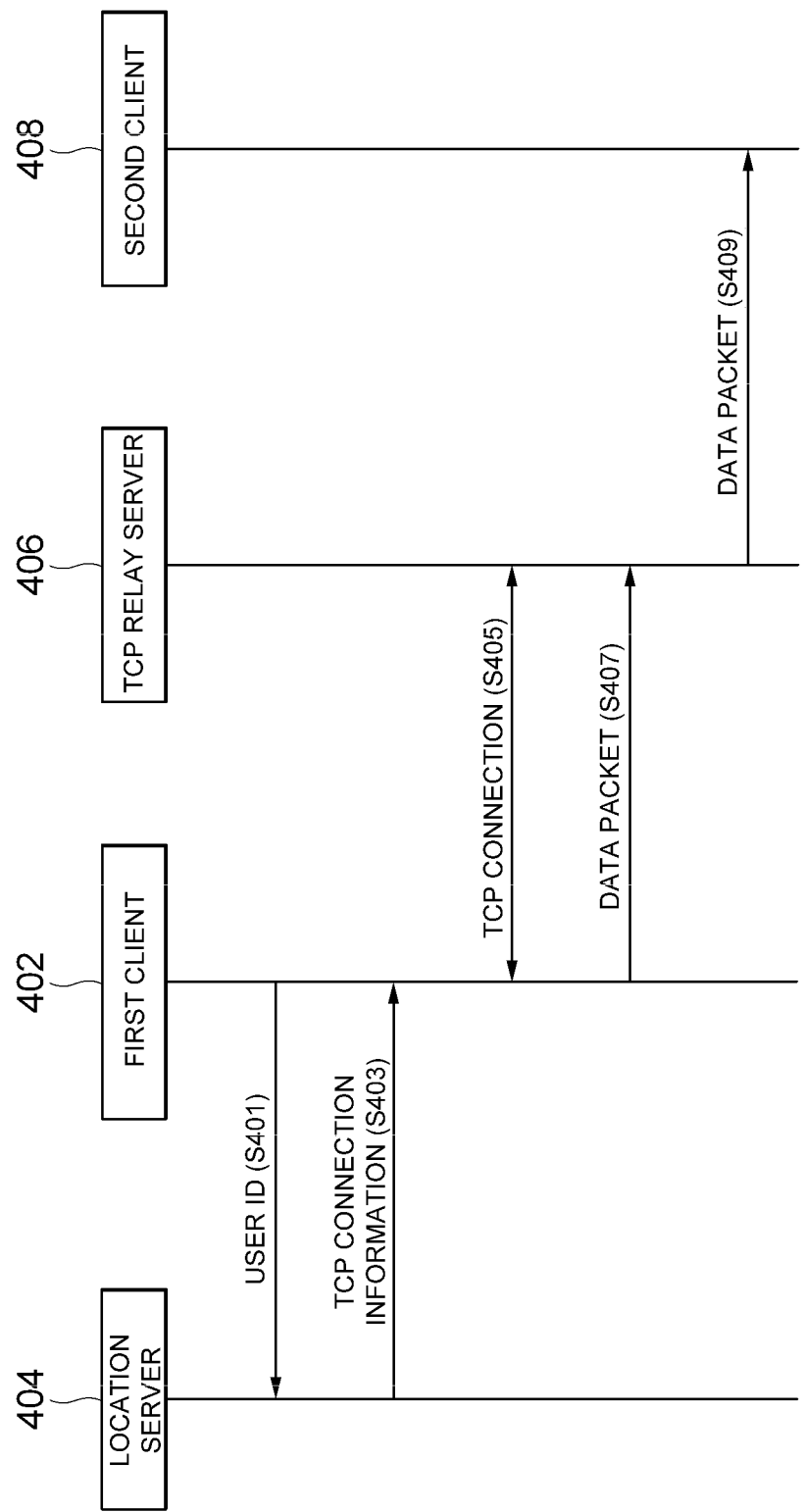
FIG. 5 is a diagram showing a method of transmitting data from a client using TCP to a client using TCP.

FIG. 5 is a diagram showing a method of transmitting data from a first client using TCP to a second client using TCP.

Referring to FIG. 5, when a first client 402 transmits data to a second client 408, the first client 402 transmits a user ID of the second client 408 to a location server 404 (S401).

Next, the location server 404 transmits TCP connection information to the first client 402 after checking the TCP connection information of the second client 408 (S403). The TCP connection information includes an address of the TCP relay server connected to the second client 408 and a user's unique number of the second client 408. Here, the user's unique number of the second client 408 may be a number mapped to the user ID of the second client 408.

That is, because the location server 404 stores registration information of each client and an address of the TCP relay server transmitting the client registration information, it is possible to check the TCP connection information of the second client 408 through a user ID when receiving the user ID of the second client 408 from the first client 402.

Next, after checking the address of the TCP relay server 406 connected to the second client 408 from the TCP connection information, and establishing a TCP connection to the TCP relay server 406 (S405), the first client 402 transmits a data packet including the user's unique number of the second client 408 to the TCP relay server 406 (S407).

Next, after checking the user's unique number of the second client 408 from the data packet, the TCP relay server 406 transmits the data packet by checking the client (that is, the second client 408) having the TCP connection by the user's unique number (S409).

That is, because the TCP relay server 406 maps a TCP session of a client connected to the TCP relay server 406 and the user's unique number of the client, it is possible to check the TCP session of the client to which the data packet is delivered if the user's unique number is checked from the data packet received from the first client 402.

2-3. Case where Data is Transmitted from Client Using UDP to Client Using TCP

Figure 6:
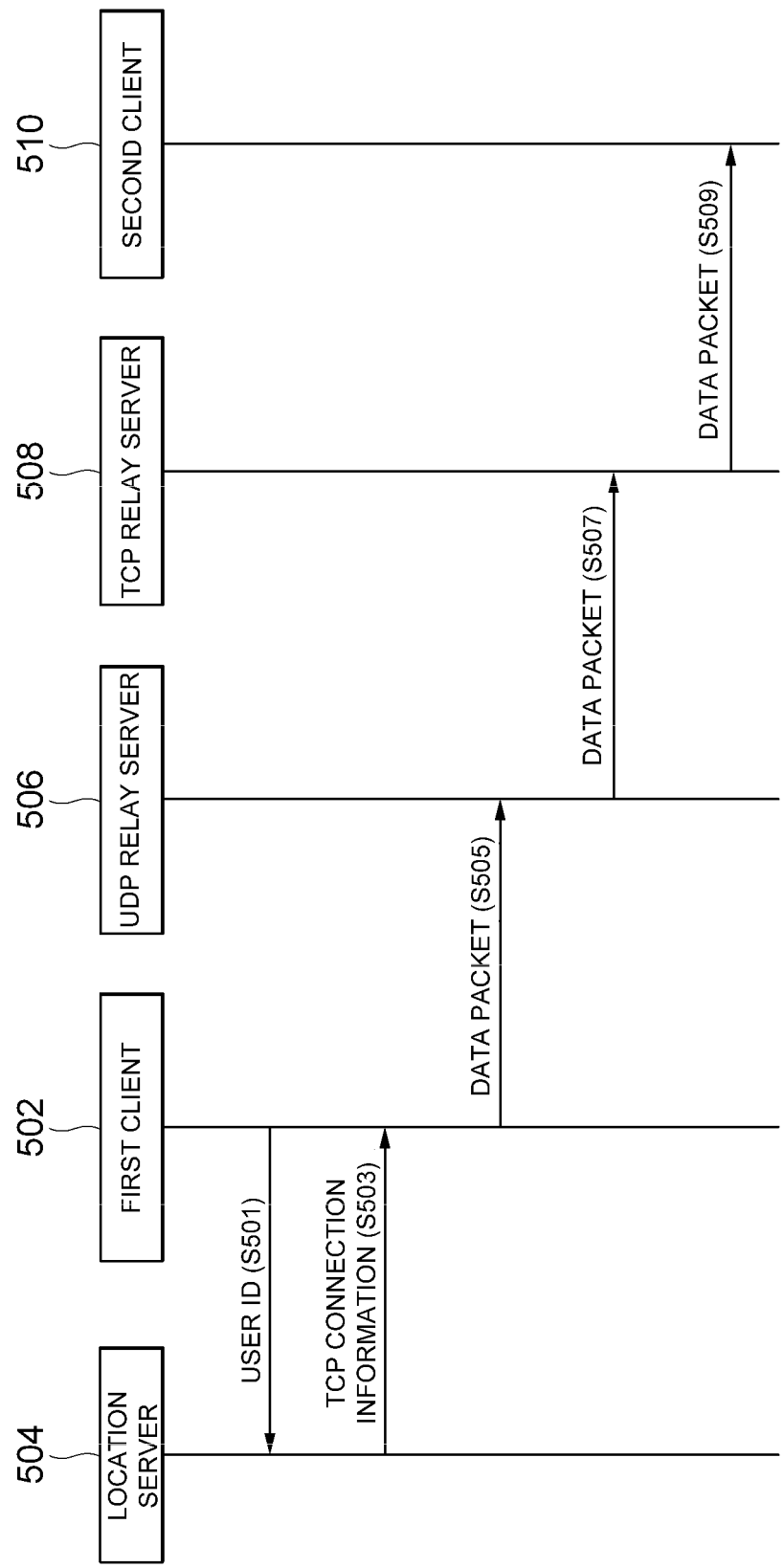
FIG. 6 is a diagram showing a method of transmitting data from a client using UDP to a client using TCP.

FIG. 6 is a diagram showing a method of transmitting data from a first client using UDP to a second client using TCP. In this case, the first client transmits the data to the second client by way of a UDP relay server and a TCP relay server in this order.

Referring to FIG. 6, a first client 502 transmits a user ID of a second client 510 to a location server 504 (S501).

Next, the location server 504 transmits TCP connection information to the first client 502 after checking the TCP connection information of the second client 510 through the user ID of the second client 510 (S503). The TCP connection information includes an address of a TCP relay server 508 connected to the second client 510 and a user's unique number of the second client 510.

Next, the first client 502 transmits a data packet including the TCP connection information to a UDP relay server 506 connected to the first client 502 (S505).

Next, the UDP relay server 506 transmits the data packet including the TCP connection information to the TCP relay server 508 after checking an address of the TCP relay server 508 connected to the second client 510 from the TCP connection information of the data packet (S507).

Next, the TCP relay server 508 transmits the data packet by checking the client (that is, the second client 510) having the TCP connection to the TCP relay server 508 by the user's unique number after checking the user's unique number of the second client 510 from the TCP connection information of the data packet (S509).

2-4. Case where Data is Transmitted from Client Using TCP to Client Using UDP

FIG. 7 is a diagram showing a method of transmitting data from a first client using TCP to a second client using UDP. In this case, the first client transmits the data to the second client by way of the TCP relay server and the UDP relay server in this order.

Referring to FIG. 7, a first client 602 transmits a user ID of a second client 610 to a location server 604 (S601).

Next, the location server 604 transmits UDP connection information of the second client 610 to the first client 602 (S603). The UDP connection information includes an address of a UDP relay server 608 connected to the second client 610 and an address mapped to a public network of the second client 610 (for example, a public IP address mapped to a private IP address of the second client 610 and a public port number mapped to a private port number of the second client 610).

Next, after establishing a TCP connection to a TCP relay server 606 connected to the first client 602 (S605), the first client 602 transmits a data packet including the UDP connection information to the TCP relay server 606 (S607).

Next, after checking an address of the UDP relay server 608 connected to the second client 610 from the UDP connection information, the TCP relay server 606 transmits the data packet including the UDP connection information to the UDP relay server 608 (S609).

Next, after checking a public mapping address of the second client 610 from the UDP connection information, the UDP relay server 608 transmits the data packet to the public mapping address of the second client 610 (S611). Then, a NAT belonging to the private network of the second client 610 converts a public IP address among addresses mapped to the public network into a private IP address mapped thereto, converts a public port number of the address mapped to the public network into a private port number mapped thereto, and delivers the private IP address and the private port number to the second client 610.

At this time, the second client 610 can receive the data packet because a connection is maintained through hole punching with the UDP relay server 608.

On the other hand, the data packet transmitted by the first client 602 may include an address of the TCP relay server 606 connected to the first client 602. In this case, the second client 610 receiving the data packet can deliver data using the TCP relay server 606 when transmitting the data to the first client 602 after storing the address of the TCP relay server 606.

According to an exemplary embodiment, it is also possible to transmit data through a UDP relay server even in an environment where a client does not establish a UDP connection, and transmit data even when the types of relay servers connected to each client are different. Therefore, it is possible to transmit data through a relay server regardless of a network environment of each client.

3. Ensuring Data Transmission Reliability

When data is transmitted using a relay server between P2P clients, the relay server only functions to relay the data, so that it is not possible to determine whether or not the data has been actually transmitted to a second client. Accordingly, in an exemplary embodiment, when the first client transmits data to the second client through the relay server, data is divided into fragments smaller than a maximum transmission unit (MTU) of a network, and the fragments are transmitted. At this time, a transaction number is assigned to the data and a fragment number is assigned to a packet fragment.

The second client transmits an ACK message to the first client with respect to the transaction number of the data and the fragment number of each packet fragment. At this time, the relay server bypasses and delivers the ACK message to the first client.

In this case, even when each client transmits data using the relay server, the ACK message is received for the transaction number of the data and the fragment number of each packet fragment of the data, thereby determining that all data has been transmitted to a second client.

According to the exemplary embodiments, each client may transmit data while maintaining a P2P network connection through only a relay server without establishing a connection to a separate server such as a login server. In addition, it is possible to transmit data using a relay server, regardless of a TCP or UDP use environment of each client. Finally, it is possible to ensure data transmission between clients using a relay server.

An exemplary embodiment may include a recordable medium that has a program code for executing a data transmission method using a relay server. The computer readable recordable medium includes various types of recordable media in which data readable by computer systems can be stored. For example, the computer readable recordable media include a Read Only Memory (ROM), a Random Access Memory (RAM), a Compact Disc (CD)-ROM, a magnetic tape, a floppy disk, an optical data storing apparatus, etc. Also, the computer readable recordable media may be distributed in computer systems connected with each other through a network and a program code which the computer can read by a distributed processing method may be stored and executed therein.

It will be apparent to those skilled in the art that various modifications can be made to the above-described exemplary embodiments without departing from the spirit or scope of the inventive concept. Thus, it is intended that the exemplary embodiments cover all such modifications provided they come within the scope of the appended claims and their equivalents.

What is claimed is:

1. A data transmission system, comprising:
   a relay server;
   a first client configured to transmit a registration packet to the relay server; and
   a location server configured to store first client registration information transmitted by the relay server, the first client registration information comprising a user identification (ID) of the first client,
   wherein the location server is further configured to acquire an address of the relay server connected to the first client using the first client registration information, wherein the relay server transmits a registration result message to the first client after registering the first client based on the registration packet, and wherein the location server is further configured to transmit, in response to receiving the user ID of the first client from another client, the address of the relay server to said another client for data transmission from said another client to the first client.

2. The data transmission system of claim 1, wherein the registration packet comprising:
  a header comprising a private IP address of the first client and a private port number of the first client; and
  a payload comprising user identification information of the first client, the private IP address of the first client, the private port number of the first client, and a network address translator (NAT) type of a private network to which the first client belongs.

3. The data transmission system of claim 2, further comprising:
  a NAT, provided in the private network to which the first client belongs, configured to convert the private IP address of the first client included in the header in a data packet transmitted by the first client into a public IP address mapped to the private IP address, convert the private port number of the first client included in the header into a public port number mapped to the private port number, and deliver the public IP address and the public port number to the relay server.

4. The data transmission system of claim 1, wherein the first client registration information further comprises at least one from among the private IP address of the first client, the private port number of the first client, the NAT type of the private network to which the first client belongs, the public IP address mapped to the private IP address of the first client, and the public port number mapped to the private port number of the first client.

5. The data transmission system of claim 4, wherein the relay server is a transmission control protocol (TCP) relay server or a user datagram protocol (UDP) relay server.

6. The data transmission system of claim 5, wherein the relay server is the UDP relay server and the first client transmits a data packet comprising UDP connection information to the UDP relay server connected to a second client after acquiring the UDP connection information of the second client from the location server.

7. The data transmission system of claim 6, wherein the UDP connection information comprises an address of the UDP relay server connected to the second client and an address mapped to a public network of the second client.

8. The data transmission system of claim 7, wherein the UDP relay server connected to the second client delivers the data packet to the address mapped to the public network of the second client after checking the address mapped to the public network of the second client from the UDP connection information.

9. The data transmission system of claim 5, wherein the first client transmits a data packet comprising TCP connection information to the TCP relay server connected to a second client after acquiring the TCP connection information of the second client from the location server.

10. The data transmission system of claim 9, wherein the TCP connection information comprises an address of the TCP relay server connected to the second client and user identification information of the second client.

11. The data transmission system of claim 10, wherein the relay server connected to the second client delivers the data packet to the second client having a TCP connection after checking the second client having the TCP connection to the relay server through the user identification information of the second client from the TCP connection information.

12. The data transmission system of claim 5, wherein the first client transmits a data packet comprising TCP connection information to the UDP relay server connected to the first client after acquiring the TCP connection information of a second client from the location server.

13. The data transmission system of claim 12, wherein the TCP connection information comprises an address of the TCP relay server connected to the second client and user identification information of the second client.

14. The data transmission system of claim 13, wherein:
  the UDP relay server delivers the data packet to the TCP relay server connected to the second client after checking the address of the TCP relay server connected to the second client from the TCP connection information, and
  the TCP relay server connected to the second client delivers the data packet to the second client having the TCP connection after checking the second client having the TCP connection to the TCP relay server through the user identification information of the second client from the TCP connection information.

15. The data transmission system of claim 5, wherein the first client transmits a data packet comprising UDP connection information to the TCP relay server connected to the first client after acquiring the UDP connection information of a second client from the location server.

16. The data transmission system of claim 15, wherein the UDP connection information comprises an address of the UDP relay server connected to the second client and an address mapped to a public network of the second client.

17. The data transmission system of claim 16, wherein:
  the TCP relay server delivers the data packet to the UDP relay server connected to the second client after checking the address of the UDP relay server connected to the second client from the UDP connection information, and
  the UDP relay server connected to the second client delivers the data packet to the address mapped to the public network of the second client after checking the address mapped to the public network of the second client from the UDP connection information.

18. The data transmission system of claim 6, wherein the first client divides the data packet into a plurality of fragments, transmits the plurality of fragments, assigns a transaction number to the data packet, and assigns fragment numbers to the plurality of packet fragments.

19. The data transmission system of claim 18, wherein the second client transmits an acknowledgement (ACK) corresponding to the transaction number of the data packet and one of the fragment numbers of the plurality of packet fragments to the first client.

20. The data transmission system of claim 1, wherein, if the relay server is a transmission control protocol (TCP) relay server, the first client transmits the registration packet to the TCP relay server after establishing a TCP connection to the TCP relay server.

21. The data transmission system of claim 1, wherein, if the relay server is a user datagram packet (UDP) relay server, the first client periodically transmits a Keep Alive message to the UDP relay server after receiving the registration result message, and the UDP relay server retransmits the Keep Alive message to the first client.

22. A data transmission method using a relay server, comprising:
    receiving, by the relay server, a registration packet from a first client;
    transmitting, by the relay server, a registration result message to the first client after registering the first client through the registration packet;
    transmitting, by the relay server, registration information of the first client to a location server, the first client registration information comprising a user identification (ID) of the first client;
    acquiring, by the location server, an address of the relay server connected to the first client using the registration information; and
    in response to receiving the user ID of the first client from another client, transmitting, by the location server, the address of the relay server to said another client for data transmission from said another client to the first client.

23. The data transmission method of claim 22, wherein the first client registration information further comprises at least one from among a private IP address of the first client, a private port number of the first client, a network address translator (NAT) type of a private network to which the first client belongs, a public IP address mapped to the private IP address of the first client, and a public port number mapped to the private port number of the first client.

24. The data transmission method of claim 23, wherein the relay server is a transmission control protocol (TCP) relay server or a user datagram protocol (UDP) relay server.

25. The data transmission method of claim 24, further comprising:
    acquiring, by the first client, UDP connection information of a second client from the location server;
    transmitting, by the first client, a data packet comprising the UDP connection information to the UDP relay server connected to the second client after checking an address of the UDP relay server connected to the second client from the UDP connection information; and
    delivering, by the UDP relay server connected to the second client, the data packet to an address mapped to a public network of the second client after checking the address mapped to the public network of the second client from the UDP connection information.

26. The data transmission method of claim 24, further comprising:
    acquiring, by the first client, TCP connection information of a second client from the location server;
    transmitting, by the first client, a data packet comprising the TCP connection information to the TCP relay server connected to the second client after checking an address of the TCP relay server connected to the second client from the TCP connection information; and
    delivering, by the TCP relay server connected to the second client, the data packet to the second client having a TCP connection after checking the second client having the TCP connection to the TCP relay server through user identification information of the second client from the TCP connection information.

27. The data transmission method of claim 24, further comprising:
    acquiring, by the first client, TCP connection information of a second client from the location server;
    transmitting, by the first client, a data packet comprising the TCP connection information to the UDP relay server connected to the first client;
    delivering, by the UDP relay server, the data packet to the TCP relay server connected to the second client after checking an address of the TCP relay server connected to the second client from the TCP connection information; and
    delivering, by the TCP relay server connected to the second client, the data packet to the second client having a TCP connection after checking the second client having the TCP connection to the TCP relay server through user identification information of the second client from the TCP connection information.

28. The data transmission method of claim 24, further comprising:
    acquiring, by the first client, UDP connection information of a second client from the location server;
    transmitting, by the first client, a data packet comprising the UDP connection information to the TCP relay server connected to the first client;
    delivering, by the TCP relay server, the data packet to the UDP relay server connected to the second client after checking an address of the UDP relay server connected to the second client from the UDP connection information; and
    delivering, by the UDP relay server connected to second client, the data packet to an address mapped to a public network of the second client after checking the address mapped to the public network of the second client from the UDP connection information.

29. A non-transitory computer readable medium having instructions recorded thereon to perform the method of claim 22.

30. A data transmission method comprising:
    transmitting connection information of a second client from a location server to a first client, the connection information being acquired by the location server using registration information, comprising a user identification (ID) of the second client, transmitted from a second server to which the second client is registered;
    transmitting a data packet comprising the connection information from the first client to a first server connected to the first client;
    delivering the data packet from the first server to the second server connected to the second client after checking an address of the second server connected to the second client from the connection information; and
    delivering the data packet from the second server to the second client after checking the second client having the connection to the second server through the user ID of the second client from the connection information,
    wherein the transmitting the connection information comprises transmitting the address of the second server from the location server to the first client in response to receiving the user ID of the second client from the first client.

31. The data transmission method of claim 30, wherein the first server is a user datagram protocol (UDP) relay server and the second server is a transmission control protocol (TCP) relay server.

32. The data transmission method of claim 30, wherein the first server is a TCP relay server and the second server is a UDP relay server.

33. A data transmission method comprising:
    transmitting connection information of a second client from a location server to a first client, the connection information being acquired by the location server using registration information, comprising a user identification (ID) of the second client, transmitted from a first server to which the second client is registered;
    transmitting a data packet comprising the connection information from the first client to the first server connected to the first client after checking an address of the first server connected to the second client from the connection information; and delivering the data packet from the first server to the second client after checking the second client having the connection to the first server through the user ID of the second client from the connection information, wherein the transmitting the connection information comprises transmitting the address of the first server from the location server to the first client in response to receiving the user ID of the second client from the first client.

34. The data transmission method of claim 33, wherein the first server is a transmission control protocol (TCP) relay server.

35. The data transmission method of claim 34, wherein the connection information is TCP connection information.

36. The data transmission method of claim 33, wherein the first server is a user datagram protocol (UDP) relay server.

37. The data transmission method of claim 36, wherein the connection information is UDP connection information.

* * * * *